UNITED STATES PATENT OFFICE.

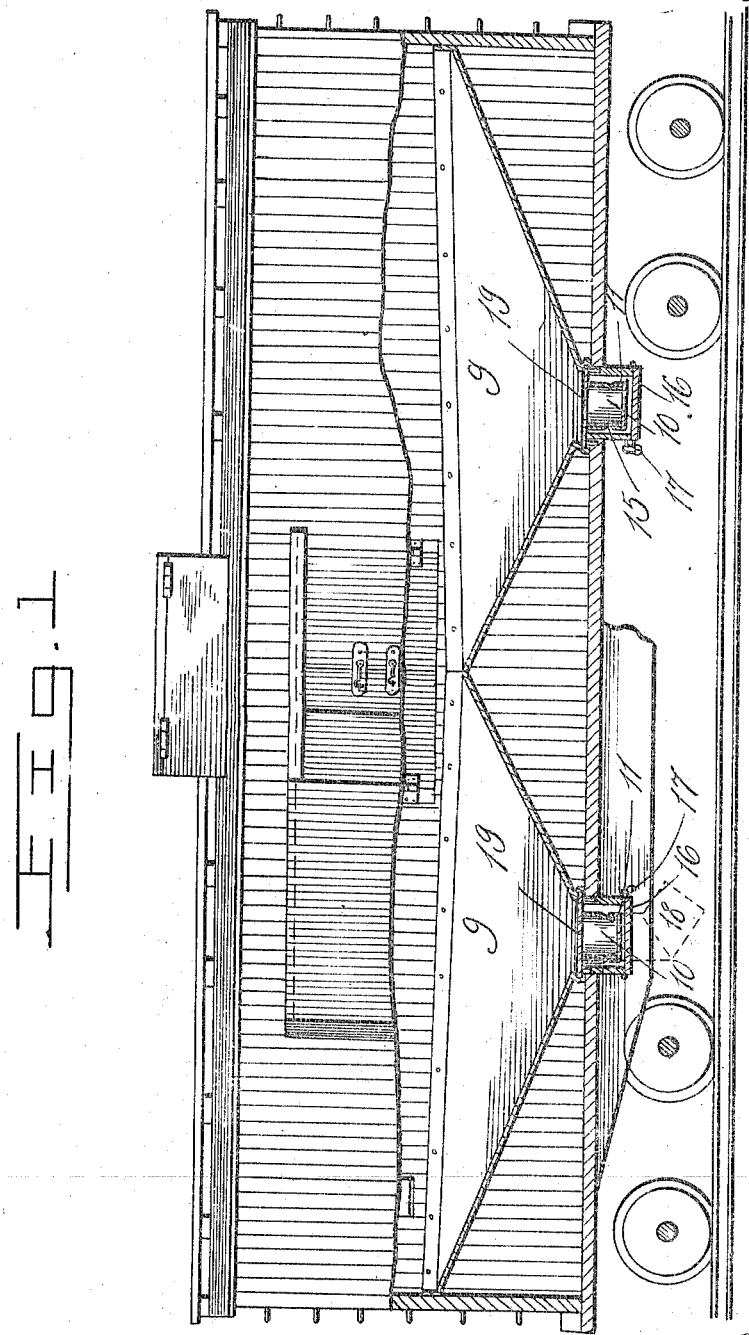

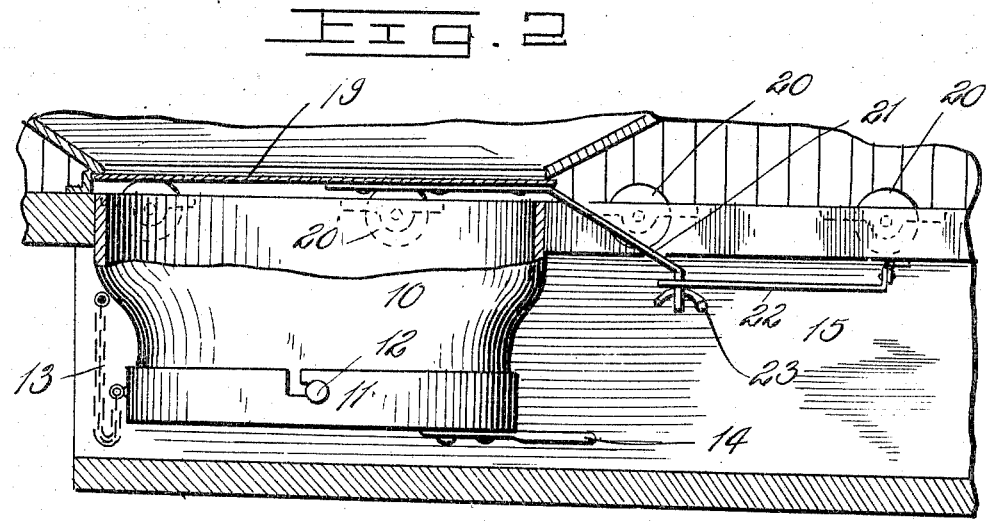
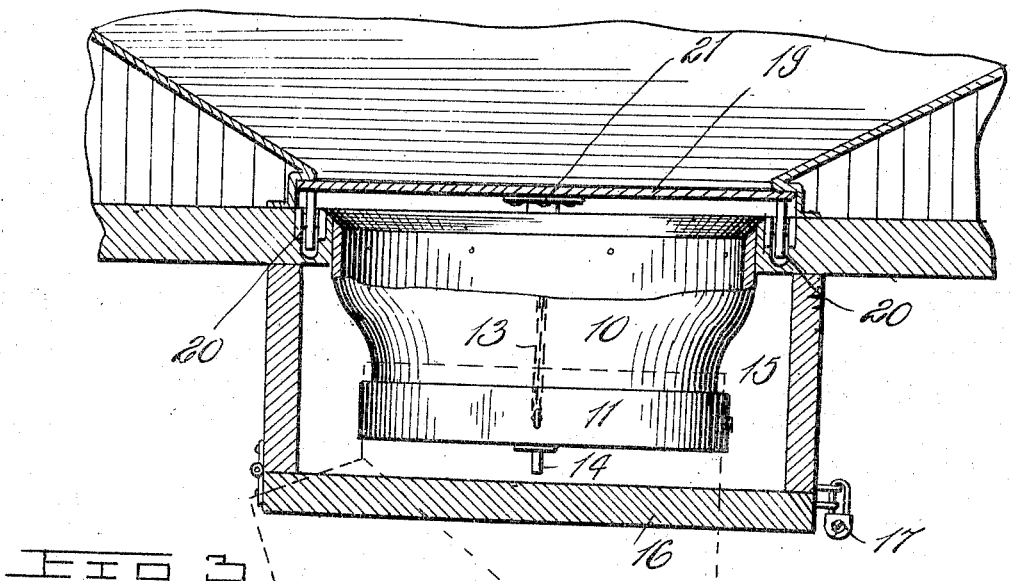

ADÉLARD GUAY, OF MONTREAL, QUEBEC, CANADA, ASSIGNOR OF ONE-THIRD TO OVILA LETOURNEAU AND ONE-THIRD TO PACIFIQUE BELAIR, OF MONTREAL, QUEBEC, CANADA.

GRAIN-CAR.

1,316,713.

Specification of Letters Patent. Patented Sept. 23, 1919.

Application filed March 12, 1919. Serial No. 282,111.

*To all whom it may concern:*

Be it known that I, ADÉLARD GUAY, a subject of the King of Great Britain, residing at Montreal, Province of Quebec, Canada, have invented certain new and useful Improvements in Grain-Cars; and I do hereby declare that the following is a full, clear, and exact description of the invention, such as will enable others skilled in the art to which it appertains to make and use the same.

The present invention relates to improvements in grain cars and has for its object the provision of improved means for discharging the contents of the same.

The invention consists in the combination and arrangement of parts hereinafter described and claimed.

The invention will be best understood by reference to the accompanying drawings forming a part of this application and in which, Figure 1 is a side view of a grain car embodying the invention;

Fig. 2 is an enlarged detail transverse sectional view of one of the discharging spouts;

Fig. 3 is a longitudinal sectional view of the same.

The preferred form of construction as illustrated in the drawings comprises a box car of any suitable or desired construction and having its bottom formed to constitute two discharging hoppers 9 and 9, one serving to discharge the contents of one end of the car, and the other serving to discharge the contents of the other end thereof. The discharging spout 10 leads from the bottom of each of the hoppers 9 and is provided with a removable cap 11 having a bayonet catch connection 12 therewith and also flexibly connected therewith by means of a chain 13. Each of the caps 11 are provided with an operating handle 14 and each discharging spout is inclosed in a housing 15 provided with an upwardly swinging bottom 16 and held in closed position by means of a suitable lock 17. A detachable directing spout 18 is also provided and which may, if desired, be attached to either of the spouts 10 to direct the flow of grain therefrom as desired. Each of the discharging spouts 10 is controlled by a slide valve 19 riding upon rollers 20 and equipped with an operating handle 21. The operating handle 21 coöperates with a vertical swinging locking lever or hasp 22 provided in its free end with a perforation adapted to fit over the end of the handle 21 when the valve 19 is in closed position, said handle 21 being so perforated to receive a pin or other sealing means 23 for securing the valve 19 in closed position. In this arrangement it will be observed that the discharging spouts may be securely locked, when desired, against external or unauthorized discharging of the grain from the car, but said grain may be readily discharged or removed therefrom when desired.

While I have illustrated and described the preferred form of construction for carrying out my invention this is capable of variations and modifications without departing from the spirit of the invention. I therefore do not wish to be limited to the precise form and arrangement of parts disclosed, but desire to avail myself of such variations and modifications as come within the scope of the appended claims.

Having thus fully described my invention, what I claim as new and desire to secure by Letters Patent is:

1. A grain car having a hoppered bottom, a discharging spout leading from said hopper, a housing inclosing said spout, an upwardly swinging bottom for said housing, a slide valve for closing and opening said spout, a handle on said slide valve, and means connected to the said bottom for locking said valve in closed position.

2. A grain car having a hoppered bottom, a discharging spout leading from said hopper, a housing inclosing said spout, a bottom for closing the housing, a slide valve for regulating the closing and opening of said spout, an operating handle on said valve, a locking hasp adapted to receive said handle, and means carried by said handle and engaging said hasp for sealing the valve in closing position.

3. A grain car having a hoppered bottom; a discharging spout leading from said hopper; a slide valve closing and opening said spout; an operating handle on said valve; a vertically swinging locking hasp slotted to receive said handle therein, a perforation in said handle; and sealing means insertible through the perforation in said handle to seal said handle in closing position, substantially as described.

4. A grain car having a hoppered bottom; a discharging spout leading from said hopper; a slide valve closing and opening said spout; an operating handle on said valve; a vertically swinging locking hasp slotted to receive said handle therein, a perforation in said handle; sealing means insertible through the perforation in said handle to seal said handle in closing position; a housing inclosing said spout, an upwardly swinging bottom for said housing, and a lock for said bottom.

5. A grain car having a hoppered bottom, a discharge spout leading from said hopper, a slide valve for regulating the closing and opening of said spout, an operating handle carried by said valve, a hasp member pivotally mounted on said car bottom, connecting means for the handle and hasp member, and means for actuating said hasp and handle for sealing the said valve in closed position.

6. A grain car having a hoppered bottom, a discharge spout leading from said hopper, a slide valve for regulating the closing and opening of said spout, an operating handle carried by said valve, a hasp member pivotally mounted on said car bottom, connecting means for the handle and hasp member, and means for actuating said hasp and handle for operating said valve to open position.

In witness whereof I have hereunto set my hand.

ADÉLARD GUAY.